US007308003B2

United States Patent
Lev et al.

(10) Patent No.: US 7,308,003 B2
(45) Date of Patent: Dec. 11, 2007

(54) SYSTEM AND METHOD FOR RE-MULTIPLEXING MULTIPLE VIDEO STREAMS

(75) Inventors: Eitan Lev, Even Yehuda (IL); Nir Drang, Naharia (IL)

(73) Assignee: Scopus Network Technologies Ltd., Rosh Ha ayin (IL)

( * ) Notice: Subject to any disclaimer, the term of this patent is extended or adjusted under 35 U.S.C. 154(b) by 916 days.

(21) Appl. No.: 10/725,336

(22) Filed: Dec. 2, 2003

(65) Prior Publication Data

US 2004/0179509 A1    Sep. 16, 2004

(51) Int. Cl.
*H04J 3/24* (2006.01)

(52) U.S. Cl. ............... 370/474; 370/229; 370/230; 370/231; 370/232; 370/233; 370/468; 370/473; 370/476; 370/477; 370/466; 725/101; 725/102; 725/103; 725/104; 725/115; 725/136; 725/145

(58) Field of Classification Search ............ None
See application file for complete search history.

(56) References Cited

U.S. PATENT DOCUMENTS 6,438,145 B1    8/2002  Movshovich et al.
7,039,048 B1 *  5/2006  Monta et al. ............ 370/389
2002/0007491 A1 * 1/2002  Schiller et al. ............ 725/87
2002/0061022 A1 * 5/2002  Allen et al. ............ 370/392

* cited by examiner

*Primary Examiner*—Raj K. Jain
(74) *Attorney, Agent, or Firm*—Edward Langer; Shiboleth Yisraeli Roberts Zisman & Co.

(57) ABSTRACT

A multimedia packet re-multiplexer system having a plurality of multimedia sources, each multimedia source sending incoming multimedia packets, each packet having a header which includes a packet identifier (PID) to determine the packet type. The system includes an interface multiplexer (mux) for periodically scanning the multimedia sources for the incoming packets. The system also includes a main storage device for storing each incoming packet, a secondary storage device having a cut-through mechanism for storing the header of each incoming packet, an input classifier for selecting a process for each packet stored in the main storage device, in accordance with the corresponding header from the secondary storage device. Each packet type is dispatched from the main storage device to one of a plurality of processors selected in accordance with availability, such that the cut-through mechanism provides efficient digital video processing via the plurality of processors, enabling gigabit bandwidth throughput for digital video re-multiplexing.

12 Claims, 6 Drawing Sheets

SYSTEM AND METHOD FOR RE-MULTIPLEXING MULTIPLE VIDEO STREAMS

FIELD OF THE INVENTION

The present invention relates generally to re-multiplexing multiple video streams, and particularly to efficient re-multiplexing of multiple high-bandwidth streams carrying digital video and data.

BACKGROUND OF THE INVENTION

The world of video and television is in the middle of a move from the analog era to the digital era. All over the world, broadcasters are changing their infrastructure to support both analog and digital services, until the digital revolution is complete.

A major issue for multiple service operators (MSO's) is gathering digital transmissions from several sources, such as satellite channels, encoders and video servers, and binding them to new digital streams at a constant bit-rate. The action of selecting programs from existing bunches of programs, and reorganizing them into new bunches of programs, is called re-multiplexing.

A typical digital video program needs a bandwidth of about 4 Megabits per second. MSO's promise their customers to provide a variety of interactive services, such as video on demand and time-shifted TV. For re-multiplexers to provide these services concurrently to a large number of users requires a huge aggregated bandwidth of many Gigabits per second and powerful processors.

Current re-multiplexers usually use standard processors, such as general-purpose processors and digital signal processors (DSP's), to provide the functionality of re-routing digital video packets to a defined output port. These processors lack the ability to effectively handle the amounts of bandwidth required for the interactive services. Numerous re-multiplexers would be needed in a digital head-end for this purpose, causing both high expenses and complicated management.

Several techniques are already in use for several years in fields such as Telecom, to efficiently handle routing of large amounts of data. One of these techniques is usage of several processors working in parallel for the same application, thereby shortening processing time linearly. Another technique is called "cut-through," based on the concept of a quick decision on how to handle a packet according to a header, for example, only. Since there is no need to wait for the arrival of the full packet before the decision, waiting time is saved and the processing efficiency is improved. U.S. Pat. No. 6,438,145 to Movshovich et al, describes a "Transport packet distribution system and method using local header." Local information is generated and included in a header for each transport packet, which is used for identification and distribution.

These techniques are not yet adopted by the world of digital video, and using them may provide the tools to efficiently handle the growing demand of routing video packets to their destination.

Therefore, it would be advantageous to provide a re-multiplexer wherein the digital video packets can be processed at gigabit bandwidth rates.

SUMMARY OF THE INVENTION

Accordingly, it is a principal object of the present invention to provide a method and a system for efficient re-multiplexing, wherein digital video packets can be processed at gigabit bandwidth rates.

It is another principal object of the present invention to provide exact synchronization between audio and video of the same program, and to avoid buffer overflow and underflow situations.

It is still another principal object of the present invention to provide efficient re-multiplexing of multiple high-bandwidth streams carrying digital video and data.

It is a further object of the present invention to provide streaming protocol that can be converted from ASI to TBI, SMII or GMII protocols It is one more object of the present invention to provide re-multiplexing that can handle much wider bandwidth.

According to one broad aspect of the present invention, there is provided a multimedia packet re-multiplexer system having a plurality of multimedia sources, each multimedia source sending incoming multimedia packets, each packet having a header which includes a packet identifier (PID) to determine the packet type. The system includes an interface multiplexer (mux) for periodically scanning the multimedia sources for the incoming packets. The system also includes a main storage device for storing each incoming packet, a secondary storage device having a cut-through mechanism for storing the header of each incoming packet, an input classifier for selecting a process for each packet stored in the main storage device, in accordance with the corresponding header from the secondary storage device. In addition the system includes a plurality of processors, each corresponding to a packet type and an input dispatcher for sending each packet from the main storage device to one of the plurality of processors selected in accordance with availability, such that the cut-through mechanism provides efficient digital video processing via the plurality of processors, enabling gigabit bandwidth throughput for digital video re-multiplexing.

According to another broad aspect of the present invention, there is provided a method of re-multiplexing a plurality of incoming multiplexes of digital video streams to a plurality of outgoing multiplexes of digital video streams, the method comprising: de-serializing incoming video streams to compose packets; scanning each of the incoming ports for new packets, in a cyclic manner; passing a prefix of the packet in a pre-defined length for further processing, and storing the packet when fully arrived; classifying each packet by its prefix, specifically in DVB and ATSC video streams by its PID (program ID); dropping stuffing packets or packets of programs which should be skipped; sending packets holding management information such as tables to a general purpose processor, for analysis and for creation of new tables for the outgoing streams; dispatching payload packets to an available processor from a pool of processors, along with processing directions according to the classification; processing the payload packet in the chosen processor, and adding to it routing directions; arranging the packets outgoing from the pool of processors in their original order for each program; multiplexing payload packets with management packets coming from the general processor and routing the new multiplexes to pre-defined output ports; optionally, scrambling the multiplexes payload; and serializing the packets and sending them from the output ports.

According to further features in the described preferred embodiment, the method includes a mechanism for Program Clock Reference (PCR) correction, comprising: after a packet is received, adding trailer to each packet, and inserting into it a time stamp, taken from a local oscillator; and before the packet is routed to an output port, correcting the PCR's according to the time stamps added to the packets when arrived.

According to still further features in the described preferred embodiment, the protocol carrying the incoming packets is converted from an asynchronous protocol to a synchronous protocol.

According to further features in the described preferred embodiment, the method includes a mechanism for homogeneous null stuffing, comprising: filling high priority FIFO with packets coming from the packets router; keeping a level of Null packets in a low priority FIFO buffer; continuously scanning the FIFO buffers with priority to the high priority FIFO buffer.

The invention is particularly useful in re-multiplexers wherein the video information is coded according to DVB or ATSC standards.

Additional features and advantages of the invention will become apparent from the following drawings and description.

BRIEF DESCRIPTION OF THE DRAWINGS

For a better understanding of the invention in regard to the embodiments thereof, reference is made to the accompanying drawings and description, in which like numerals designate corresponding elements or sections throughout, and in which.

DETAILED DESCRIPTION OF THE INVENTION

The present invention will now be described in connection with certain preferred embodiments with reference to the following illustrative figures so that it may be more fully understood. References to like numbers indicate like components in all of the figures.

Figure 1:
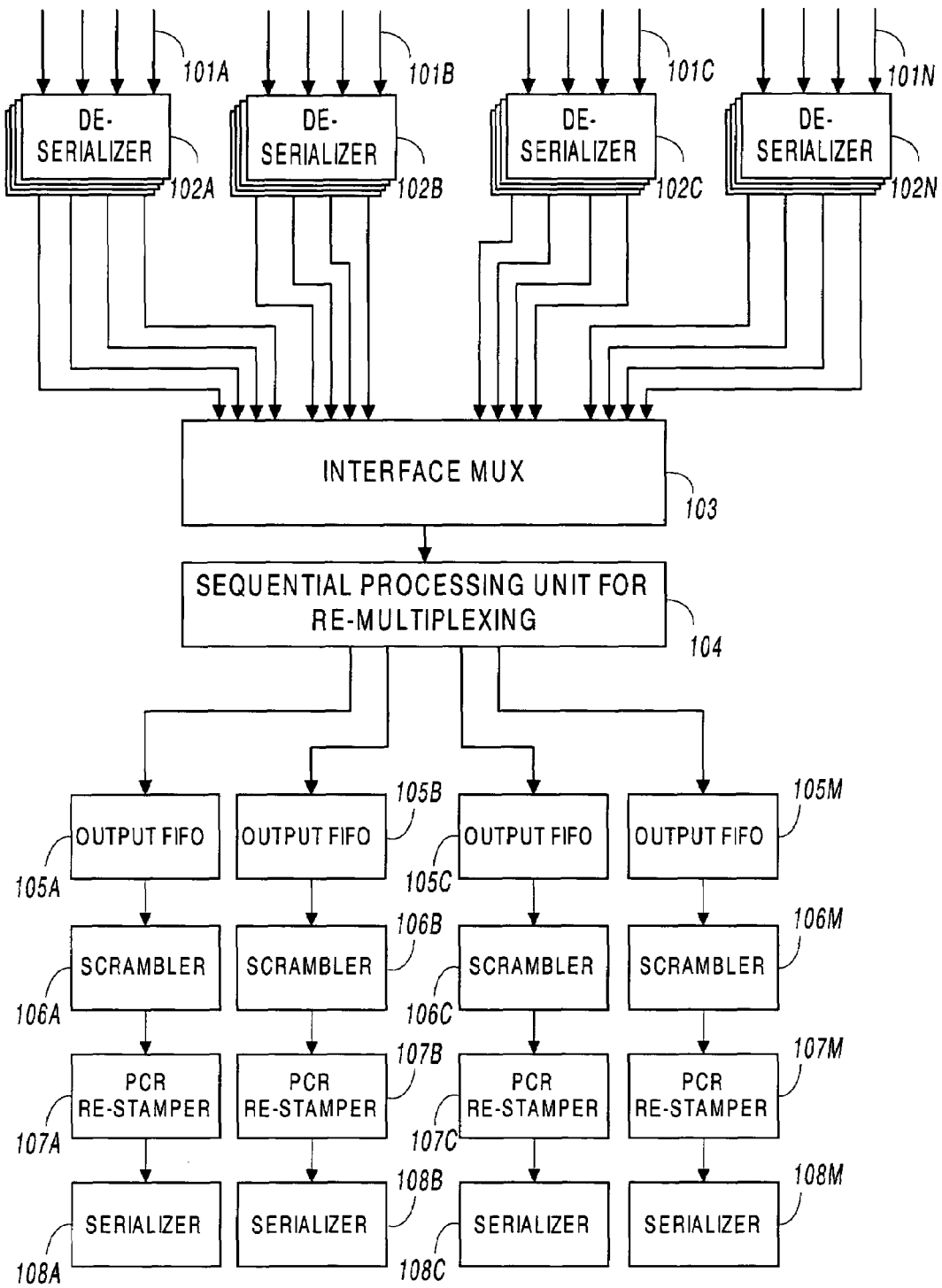
FIG. 1 schematically illustrates a block diagram of a prior art re-multiplexer, typically based on a general-purpose processor or a Digital Signal Processor (DSP)

Reference is now made to FIG. 1, which schematically illustrates a block diagram of a prior art re-multiplexer, typically based on a general-purpose processor or a Digital Signal Processor (DSP). A plurality of digital video and data sources 101A to 101N (received in Asynchronous Serial Interface (ASI) protocol: EN50083-9), are connected respectively to de-serializers 102A to 102N, converting serialized data to packets of data.

Interface multiplexer (MUX) 103 is usually a hardware-based mechanism, collecting packets and multiplexing them on one bus for later processing. Sequential processing unit 104 is typically a standard general-purpose processor and is responsible for the re-multiplexing process. Output first-in/first-out's (FIFO's) 105A to 105M receive the packets of the processed streams, after they are re-multiplexed to new output multiplexes.

Typically, some of the video streams are scrambled to limit their viewing to permitted subscribers only. Thus, scramblers 106A to 106M are optionally used to scramble one or more streams in each output multiplex. PCR re-stampers 107A to 107M handle the activity of PCR value correction, typically by calculating the change of each PCR packet new placement in relation to its original placement. Serializers 108A to 108M optionally serialize the packets to transmit them over a serial medium.

Figure 2:
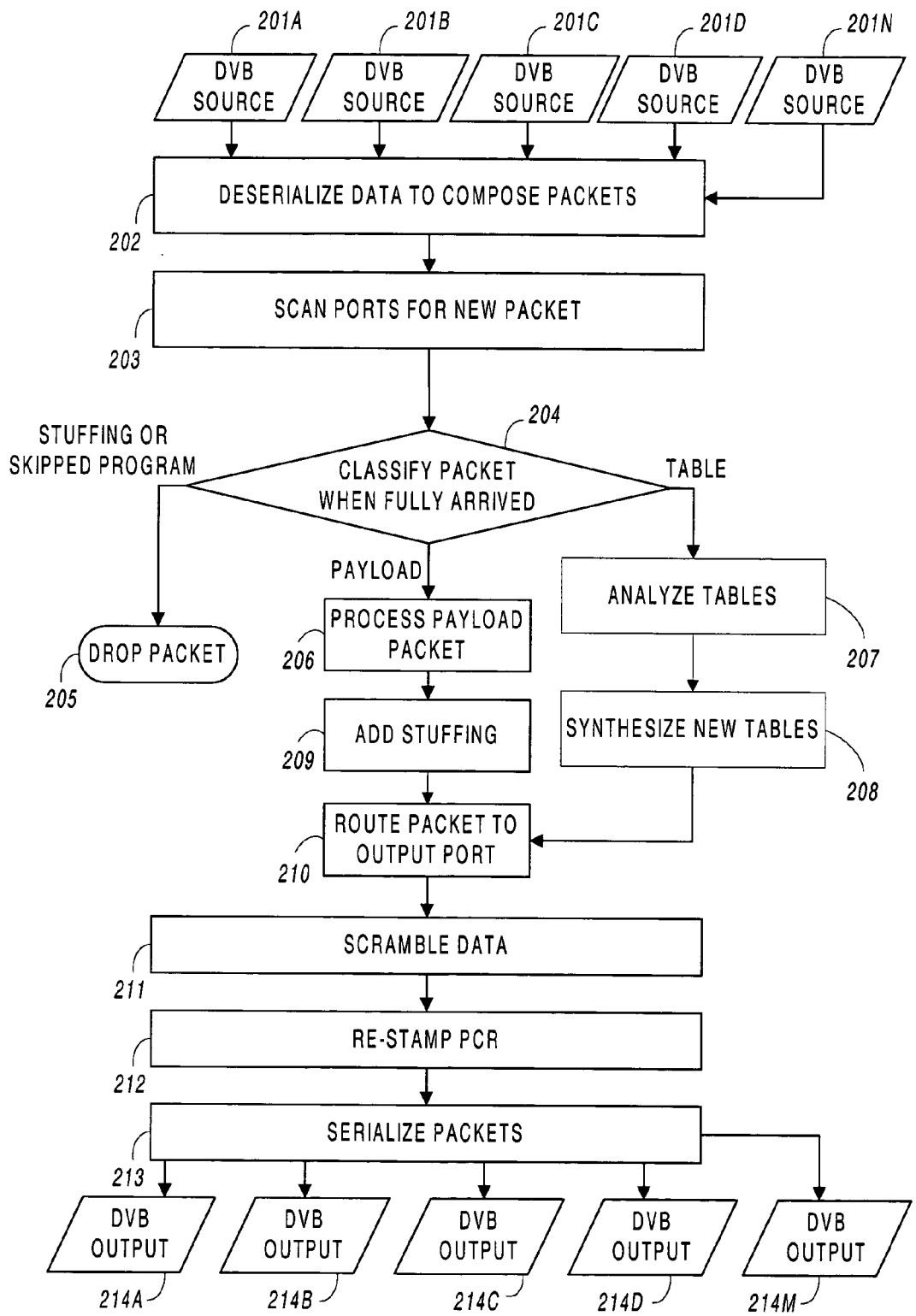
FIG. 2 is a schematic flow diagram illustrating the data flow in a typical prior art re-multiplexer, as described in FIG. 1.

FIG. 2 is a schematic flow diagram illustrating the data flow in a typical prior art re-multiplexer, as described in FIG. 1. DVB sources 201A to 201N are multiplexes that are the system inputs. The streams are de-serialized in parallel processes, to compose DVB packets (block 202). Ready packets are identified typically in a round-robin mechanism (block 203).

As described above, sequential processing unit 104 is responsible for the re-multiplexing process. Each packet is first classified (block 204) to determine its type. In the preferred embodiment, packets are DVB packets, and the classification is done according to the PID (program ID) field.

A packet identified as a stuffing packet or as a packet of a program that should be ignored, is dropped (block 205). A packet identified as containing specific additional data, in the form of Program Specific Information (PSI/SI) tables in the DVB standard, is analyzed to understand the mapping of the streams (block 207), and for further synthesis of new tables to be interleaved within the composed output multiplexes (block 208). All the rest are packets containing video, audio and data. These packets are processed, such that their PID is changed to match the definitions of the output multiplex of which they are a part (block 206). Optionally, if the output multiplex is a CBR (constant bit rate) one, null packets, called "stuffing," may be inserted to reach the required bandwidth (block 209).

Packets coming both from block 206 and block 208 are routed (block 210) according to the output multiplexes definitions, to output ports. If so defined, packets belonging to specific PID's are scrambled (block 211). PCR values are corrected (block 212), and the packets of each multiplex are serialized (block 213) and transmitted via serial ports 214A to 214N.

Figure 3:
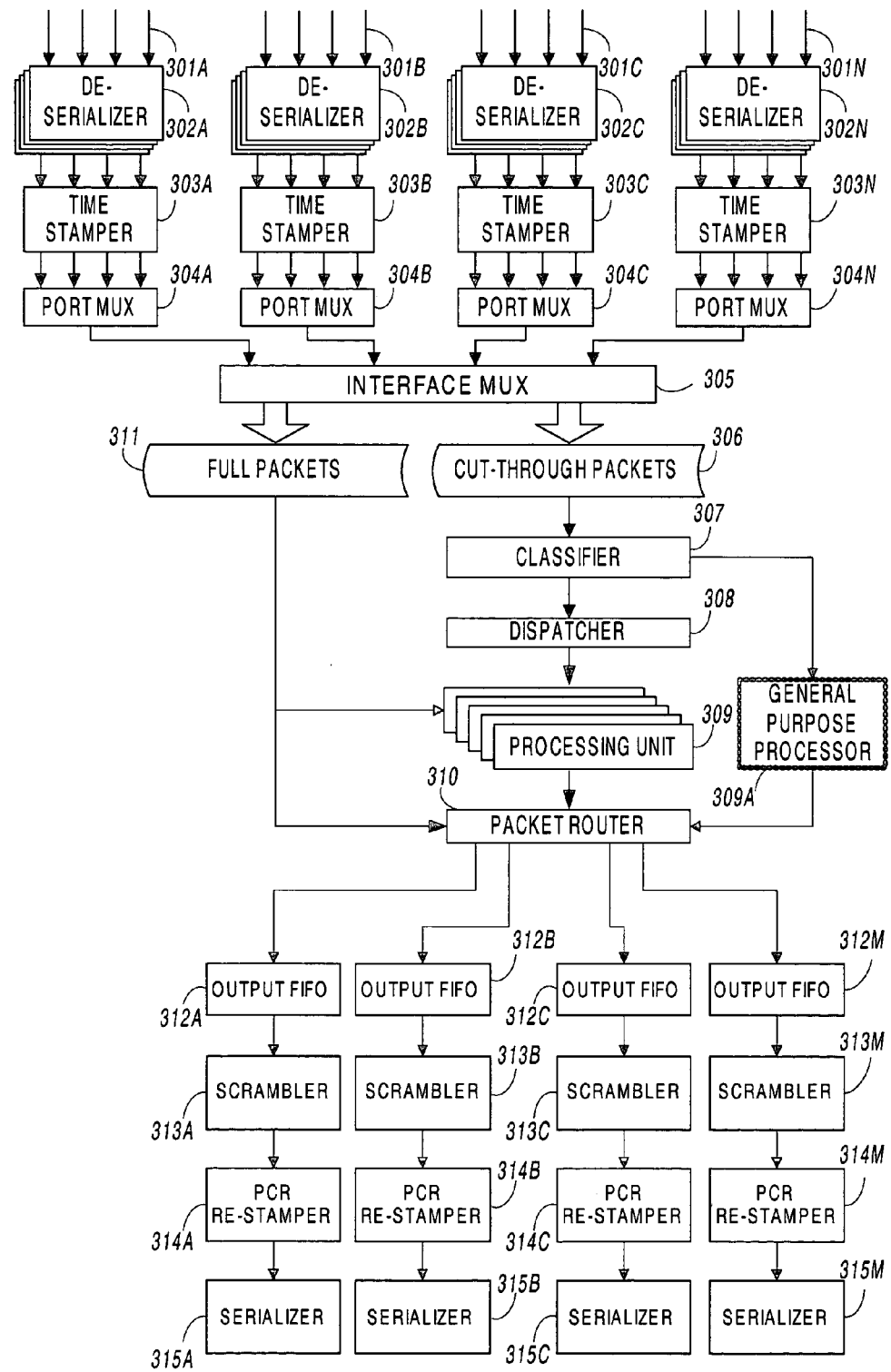
FIG. 3 schematically illustrates a block diagram of a re-multiplexer, constructed in accordance with a preferred embodiment of the present invention.

FIG. 3 schematically illustrates a block diagram of a re-multiplexer constructed in accordance with a preferred embodiment of the current invention. A plurality of digital video and data sources 301A to 301N are connected respectively to de-serializers 302A to 302N, which convert serialized data to packets of data.

A mechanism, used in the present invention to handle the Program Clock Reference (PCR) re-stamping issue, adds a header or a trailer to each PCR packet. The header or trailer has a time stamp, preferably of 42 bits, which is taken from a free-running system clock (27 MHz). The time is taken immediately when the packet enters the system and just before it is transmitted from the system, in order to calculate the time passed from its entrance, and to update the PCR value accordingly.

Time stampers 303A to 303N insert the time stamps required for the PCR re-stamping mechanism, for each of inputs 301A to 301N, respectively. Typically, DVB content is streamed using ASI protocol. In the preferred embodiment, Packet Over Sonet (POS) protocol is used internally for 2 reasons:

a. The POS protocol is more popular in packetized data transformation, and is used in many industry standard framers. Using it allows for systems integration with other packetized data transformation applications.

b. Conversion of ASI protocol to POS protocol allows the internal multiplexing of several streams over ASI protocol to a single stream over POS protocol, significantly enlarging the number of input physical ports in one re-multiplexer.

Port MUX's 304A to 304N receive a plurality of DVB streams, and convert them to one multiplex over POS protocol. The process is described in detail below in FIG. 5 and FIG. 6.

Three other popular protocols: Ten-Bit Interface (TBI); Serial Media Independent Interface (SMII); and Gigabit Media Independent Interface (GMII) (IEEE 802.3), are typically used to carry Internet Protocol (IP) packets. In the preferred embodiment, streaming protocol may be converted from ASI to TBI, SMII or GMII protocols, for the same reasons described above.

Multiplexed streams from port MUX's 304A to 304N are received at interface MUX 305, and are responsible for a high bandwidth internal multiplexing.

One of the advantages of the present invention derives from using a "cut-through" mechanism, which is used in the telecommunication world for fast classification of packetized data. This mechanism classifies a packet according to a partial predefined header of the packet, and transmits it for processing before the full packet arrives. Cut-through packets memory 306 stores the partial packet headers, while full packets memory 311 stores the full packets.

Classifier 307 examines the partial packets stored at cut-through packets memory 306, and preferably adds to each packet a header or a trailer containing the classification results, e.g., the type of the packet and processing directions. PSI/SI packets are optionally directed to general-purpose processor 309A, for tables' analysis and synthesis. PSI/SI is a general term for combined MPEG PSI and DVB-SI. DVB-SI refers to service Information carried in a DVB multiplex describing the contents of different multiplexes The MPEG Transport Stream specification includes the definition of 'Program Specific Information' which is essential for the receiver to decode the actual pictures, sound and data.

A general-purpose processor may be more suitable for this purpose, since the volume of the PSI/SI tables is significantly low, while on the other hand the processing is more complicated.

Unlike in the prior art, a plurality of processing units 309 is used to take care of the re-multiplexing process. The directing of packets to processing units 309 may be handled in one of two ways:

a. processing units 309 are treated as a pool; each packet may be processed in any of the processors; this method is more complicated, but enables more efficient usage of the processing power; and b. packets of a specific stream are directed to a specific processor.

Using either the first method or the second, the re-multiplexing process of the present invention may handle much wider bandwidth than that handled by re-multiplexers known in the prior art.

The Dispatcher 308 receives the partial packets from Classifier 307, and routes each of them to one of processing units 309, according to one of the two methods described above.

According to the present invention, processing units 309 also set packet headers that were changed by port MUX's 304, as described below in FIG. 6, back to hexadecimal 47.

Packets outgoing from processing units 309 are directed to the packet router 310, sending them to the output FIFO's 312A to 312M, according to pre-defined routing directions, to produce the output multiplexes. The Scramblers 313A to 313M are optionally used to scramble one or more streams in each output multiplex.

The PCR re-stampers 314A to 314M complement the process as described above, started with time stamping of PCR packets by time stampers 303A to 303N. Each PCR re-stamper calculates the time period elapsed from the original action of time stamping, and adds the value of this time period to the original value of the PCR.

The Serializers 315A to 315M optionally serialize the packets to transmit them over a serial medium.

Figure 4:
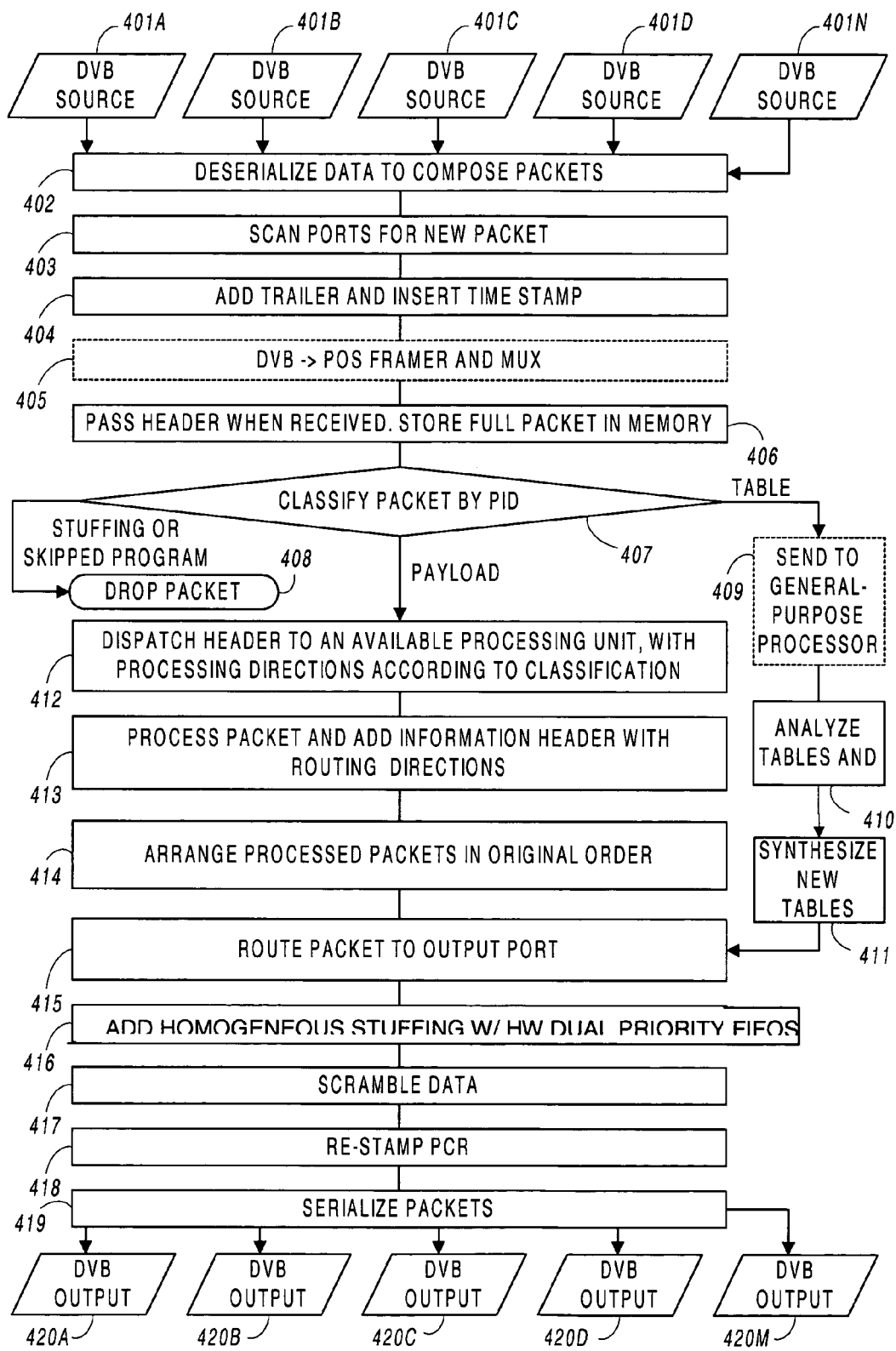
FIG. 4 is a schematic flow diagram illustrating the data flow in a re-multiplexer, constructed in accordance with a preferred embodiment of the present invention.

FIG. 4 is a schematic flow diagram illustrating the data flow in a re-multiplexer, constructed in accordance with a preferred embodiment of the present invention.

The DVB sources 401A to 401N are multiplexes that are the system inputs. The streams are de-serialized in parallel processes, to compose DVB packets (block 402). Ready packets are identified (block 403), and a trailer is added to PCR packets, containing a time-stamp taken from a free-running system clock (block 404). The protocol is converted from ASI to POS, and packets coming from different input streams are multiplexed. The process is described in detail below with reference to FIG. 5.

In the next phase, packets are stored partially at cut-through packets memory 306, and fully at full packets memory 311, as described at FIG. 3. Each incoming partial packet is classified (block 407) to determine its type. A packet identified as a stuffing packet or as a packet of a program that should be ignored, is dropped (block 408). Packets identified as containing PSI/SI tables. They are preferably transmitted to a general-purpose processor, where they are analyzed to understand the mapping of the streams (block 409), and new tables to be interleaved within the composed output multiplexes are synthesized (block 410). All the rest are packets containing video, audio and data. These packets are re-mapped, such that their PID is changed to match the definitions of the output multiplex of which they are a part.

In the preferred embodiment, each header of a packet that contains video, audio or data payload is directed to a free processor, along with processing directions according to its classification (block 411). Processing of packet contents at least involves changing the PID to match the definition of the output multiplexes and adding routing directions to the packet (block 412).

Since packets of the same stream may be processed in different processors, their original order when passing this stage might be changed. In block 413 packets of each stream identified by a unique packet identifier (PID) are re-arranged according to their original order. Due to the routing directions added to each packet (block 412), each packet is routed to a specific port of a specific output multiplex (block 414). A special null stuffing mechanism, described in detail with reference to FIG. 7 below, is used to maintain homogeneous stuffing in the case of a CBR output multiplex (block 415).

If so defined, packets belonging to specific PID's are scrambled (block 416). PCR values are corrected (block 417), and the packets of each multiplex are serialized (block 418) and transmitted via serial ports 419A to 419N.

Figure 5:
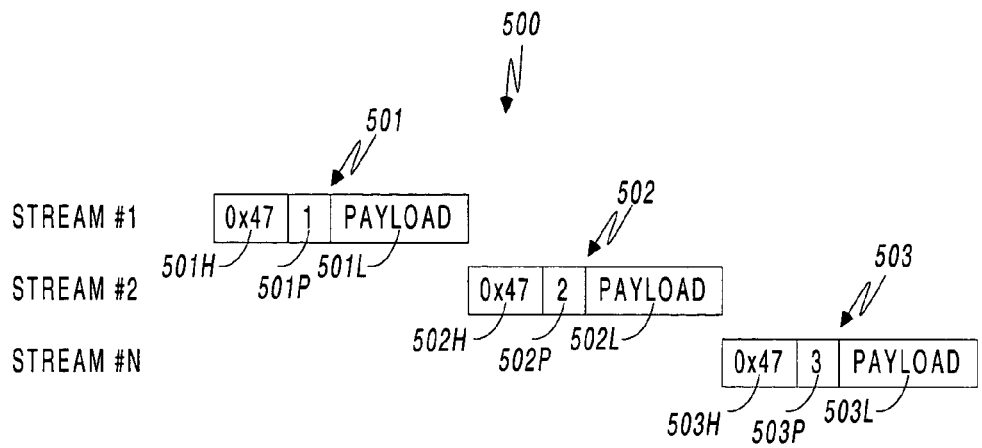
FIG. 5 illustrates an example of three incoming streams, wherein each stream has an associated packet, constructed in accordance with a preferred embodiment of the present invention.
Figure 6:
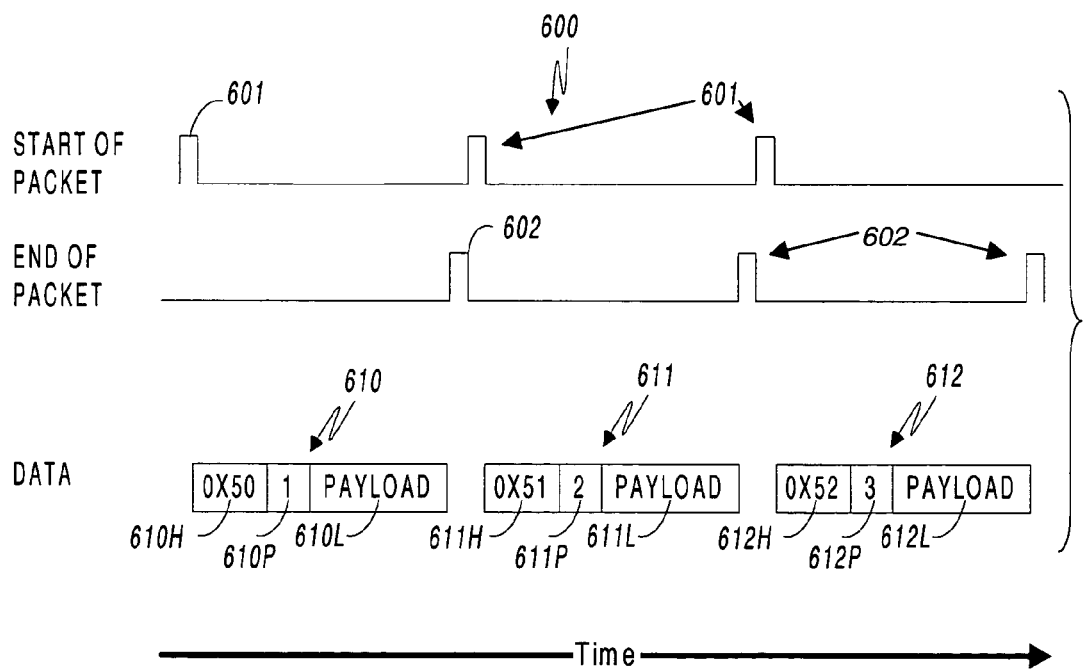
FIG. 6 illustrates the use of the POS protocol, which includes two signals: Start of Packet and End of Packet, wherein these are used to synchronize between the transmitting side and the receiving side, constructed in accordance with a preferred embodiment of the present invention.

FIG. 5 and FIG. 6 schematically illustrate the process of multiplexing several DVB streams originally transmitted in ASI protocol, to one stream transmitted in POS protocol.

FIG. 5 illustrates an example of three incoming streams 500: stream #1, stream #2 and stream #3, where packet 501 is part of stream #1, packet 502 is part of stream #2, and packet 503 is part of stream #3.

Each packet contains a header: 501H; 502H; and 503H, each with the hexadecimal value of 47; a PID field: 501P; 502P; and 503P, unique to each stream in a specific multiplex; and a payload field: 501L; 502L; and 503L. As known in the prior art, the hexadecimal 47 header is the only way for synchronization using the ASI protocol. It should be noted that streams in different multiplexes may have the same PID.

FIG. 6 illustrates POS protocol 600, which includes two signals: Start of Packet 601 and End of Packet 602, wherein together these are used to synchronize between the transmitting side and the receiving side. Thus, when DVB packets are streamed over POS protocol, the Hex 47 header becomes redundant.

According to the present invention, the Hex 47 header is changed and used to distinguish between streams coming from different input multiplexes. As illustrated in FIG. 6, the header of packets of stream #1 610 is changed to hex 50 610H, the header of packets of stream #2 611 is changed to hex 51 611H, and the header of packets of stream #3 612 is changed to hex 52 612H. Thus, even when multiplexed together, they can be uniquely identified.

Again, each packet also contains a PID field: 601P; 602P; and 603P, unique to each stream in a specific multiplex; and a payload field: 601L; 602L; and 603L.

Figure 7:
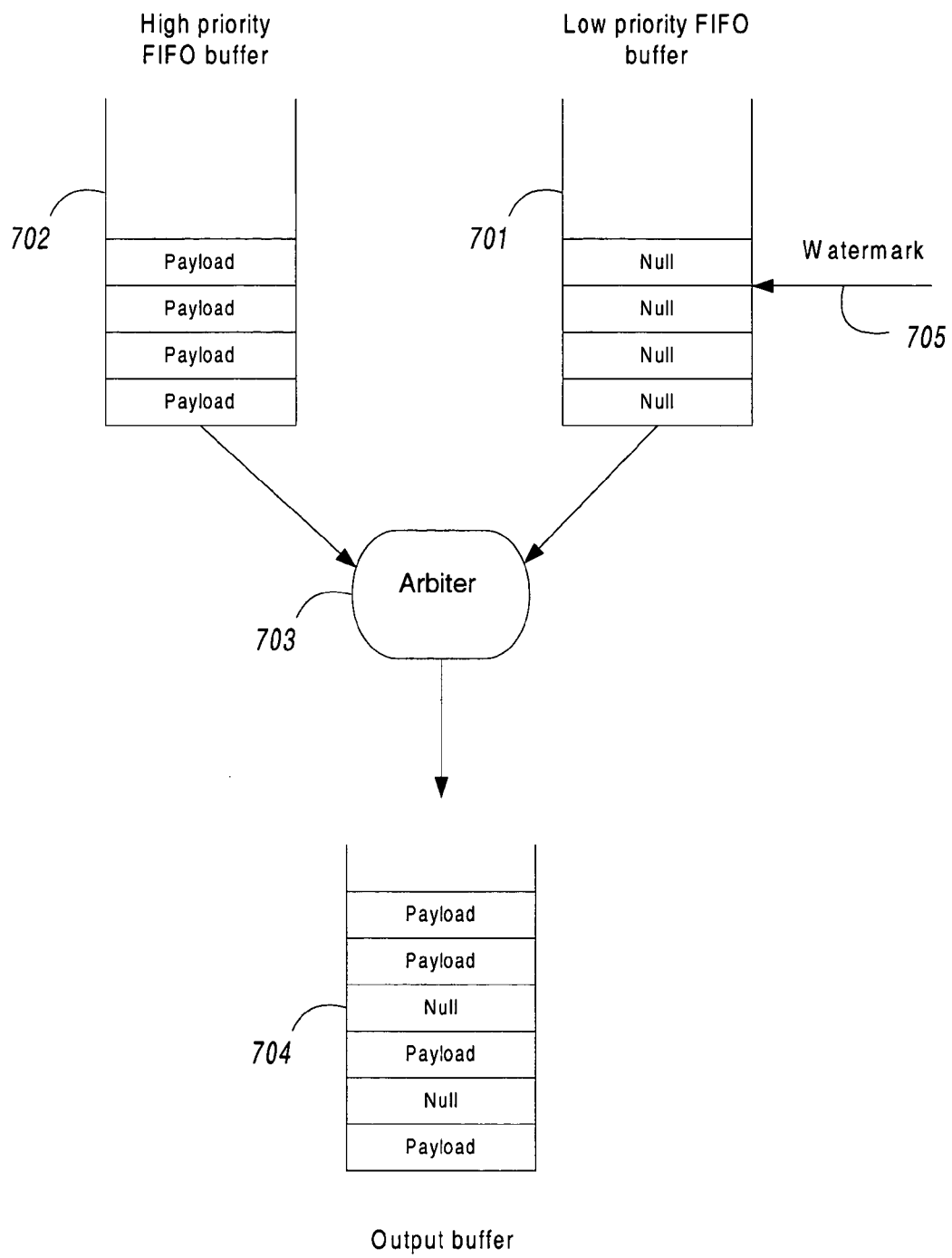
FIG. 7 schematically illustrates the process of homogeneous null stuffing, constructed in accordance with a preferred embodiment of the present invention.

FIG. 7 schematically illustrates the process of homogeneous null stuffing mentioned in block 416, constructed in accordance with the principles of the present invention. High priority FIFO buffer 702 is filled with packets coming from packets router 309. Whenever the level of the Null packet is below a defined watermark 705, low priority FIFO buffer 701 is fully filled with Null packets. Arbiter 703 continuously scans FIFO buffers 701 and 702, by the following policy: High priority FIFO buffer 702 is scanned until it is empty; only then a null packet is taken from Low priority FIFO buffer 701, and the arbiter returns to scan High priority FIFO buffer 702. Packets fetched by arbiter 703 are directed to output FIFO 704.

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

We claim:

1. A multimedia packet re-multiplexer system having a plurality of multimedia sources, each multimedia source sending incoming multimedia packets, each packet having a header which includes a packet identifier (PID) to determine the packet type, said system comprising:
an interface multiplexer (mux) for periodically scanning the multimedia sources for the incoming packets;
a main storage device for storing each incoming packet;
a secondary storage device having a cut-through mechanism for storing the header of each incoming packet;
an input classifier for selecting a process for each packet stored in said main storage device, in accordance with the corresponding header from said secondary storage device;
a plurality of processors, each corresponding to a packet type; and
an input dispatcher for sending each packet from said main storage device to one of said plurality of processors selected in accordance with availability,
such that said cut-through mechanism provides efficient digital video processing via said plurality of processors, enabling gigabit bandwidth throughput for digital video re-multiplexing,
wherein the packet types are among the following:
video;
audio;
data; and
stuffing (filler),
and wherein said system further comprises a homogeneous null stuffing module adapted to provide for transmission of constant bit-rate (CBR) streams, said homogeneous null stuffing module comprising:
a high priority first-in/first-out (FIFO) buffer filled with packets coming from a packet router;
a low priority FIFO buffer continuously filled with null packets to a pre-defined level; and
an arbiter continuously scanning said high priority FIFO buffer and said low priority FIFO buffer, according to the following procedure:
scanning said high priority FIFO buffer until it is empty;
taking a null packet from said low priority FIFO buffer; and
returning to scan the high priority FIFO buffer.

2. The system of claim 1, further comprising:
a plurality of output ports capable of transmitting the packetized video;
an output classifier, deciding for each packet, to which of said plurality of output ports to route said packet; and
an output dispatcher, sending packets stored in said main memory to said output port.

3. The system of claim 1, wherein said multimedia packets are in Digital Video Broadcasting Asynchronous Serial Interface (DVB/ASI) format and are framed to Packet Over Sonet (POS) format.

4. The system in claim 1, wherein said multimedia packets are in DVB/ASI format and are framed to Gigabit Media Independent Interface (GMII) format.

5. The system in claim 1, wherein said multimedia packets are in DVB/ASI format and are framed to Serial Media Independent Interface (SMII) format.

6. The system in claim 2, wherein each of said plurality of output ports comprises two ports, a first port for transmission of packets with high priority, and a second port for transmission of packets with low priority.

7. A method for re-multiplexing a plurality of multimedia packets, each packet having a header, the header having a packet identifier (PID) field used to determine the packet type, the method comprising:
periodically scanning for full incoming packets;
storing said full incoming packets in a main memory device;
using a cut-through mechanism for storing the header of each incoming packet in a secondary memory device;

examining the header, wherein said examining activity further comprises:
  classifying each video packet type in a classification according to its PID; and
  identifying the required process according to said classification;
selecting, according to availability, among a plurality of processors, which of said processors is to handle each said classified packet; and
processing the packets stored in said main memory device in said selected processor;
such that said cut-through mechanism provides efficient digital video processing via said plurality of processors, enabling gigabit bandwidth throughput for digital video re-multiplexing,
  wherein the method further comprises adapting a homogeneous null stuffing module to provide for transmission of constant bit-rate (CBR) streams, wherein said adapting activity further comprises:
  filling a high priority FIFO buffer with packets coming from a packet router;
  continuously filling a low priority FIFO buffer with null packets to a pre-defined level; and
  continuously scanning, via an arbiter, said high priority FIFO buffer and said low priority FIFO buffer, according to the following procedure:
    scanning said high priority FIFO buffer until it is empty;
    taking a null packet from said low priority FIFO buffer; and
    returning to scan the high priority FIFO buffer.

8. The method according to claim 7, wherein the packets of the multimedia sources are in DVB format, are originally received in ASI protocol and are framed to POS protocol.

9. The method according to claim 7, wherein the packets of the multimedia sources are in DVB format, are originally received in ASI protocol and are framed to ten-bit interface (TBI) protocol.

10. The method according to claim 7, wherein the packets of the multimedia sources are in DVB format, are originally received in ASI protocol, and are framed to GMII protocol.

11. The method according to claim 7, wherein the packets of the multimedia sources are in DVB format, are originally received in ASI protocol and are framed to SMII protocol.

12. The method according to claim 7, further comprising adding a time stamp to each packet, wherein the time is taken from a free-running system clock (27 MHz) immediately when it enters the system; and just before the packet is transmitted from the system, updating a Program Clock Reference (PCR) value according to the time passed from its entrance.

* * * * *